US012511403B2

(12) United States Patent
Arora et al.

(10) Patent No.: US 12,511,403 B2
(45) Date of Patent: Dec. 30, 2025

(54) RISK-ADJUSTMENT TECHNIQUES FOR GENERATING SOFTWARE CODE DATA

(71) Applicant: WELLS FARGO BANK, N.A., San Francisco, CA (US)

(72) Inventors: Dinesh Arora, Concord, NC (US); Dennis E. Montenegro, Concord, CA (US); Sadie S. Salim, Mill Valley, CA (US); Amlan Patnaik, Concord, NC (US); Nurujjama Beg, Plano, TX (US); Suresh Reddy, Hyderabad (IN); Ramesh Yarlagadda, Charlotte, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/647,103

(22) Filed: Apr. 26, 2024

(65) Prior Publication Data

US 2025/0335597 A1    Oct. 30, 2025

(51) Int. Cl.
  *G06F 21/57*    (2013.01)
  *G06F 8/71*    (2018.01)
(52) U.S. Cl.
  CPC .............. *G06F 21/577* (2013.01); *G06F 8/71* (2013.01); *G06F 2221/033* (2013.01)
(58) Field of Classification Search
  CPC ..... G06F 21/577; G06F 8/71; G06F 2221/033
  See application file for complete search history.

(56) References Cited

U.S. PATENT DOCUMENTS

| 9,086,735 B2 | 7/2015 | Wang et al. |
| 11,269,597 B2 | 3/2022 | Haze et al. |
| 11,758,243 B2 | 9/2023 | Niedt et al. |

(Continued)

FOREIGN PATENT DOCUMENTS

IN    202341059030    6/2023

OTHER PUBLICATIONS

Tabnine Team, "AI Code Assistant: No-Fluff Guide to Tech, Features, and Best Practices," Tabnine, Aug. 20, 2023, Available online at: https://www.tabnine.com/blog/ai-code-assistant-guide/, 17 pages.

(Continued)

*Primary Examiner* — Beemnet W Dada
(74) *Attorney, Agent, or Firm* — Kilpatrick Townsend & Stockton LLP (57) ABSTRACT

A risk-sensitive code generation computing system receives query data indicating a requested code section. A code attribute evaluation module determines attributes that indicate characteristics of the query data or the requested code section. Based on the attributes, the code attribute evaluation module calculates risk level data for the requested code section. A code generation module selects, based on the risk level data, a set of training resources. Based on the selected training resources, the risk-sensitive code generation computing system modifies training of a trained neural network model. The modified trained neural network model generates a risk-sensitive code data object based on the requested code section and the risk level data. The risk-sensitive code generation computing system provides at least a portion of the risk-sensitive code data object to an additional computing system.

20 Claims, 4 Drawing Sheets

(56) References Cited

U.S. PATENT DOCUMENTS

| | | | |
|---|---|---|---|
| 11,966,930 B1* | 4/2024 | Posert | G06N 3/04 |
| 2013/0339365 A1* | 12/2013 | Balasubramanian | G06F 8/73 |
| | | | 707/E17.061 |
| 2022/0012624 A1 | 1/2022 | Ladurini et al. | |
| 2023/0168883 A1 | 6/2023 | Sreedharan et al. | |
| 2023/0385042 A1* | 11/2023 | Obando Chacon | G06F 8/443 |
| 2024/0211225 A1* | 6/2024 | Sevcenko | G06F 8/53 |
| 2025/0045044 A1* | 2/2025 | Reynolds | G06F 8/70 |

OTHER PUBLICATIONS

AWS, "What is RAG?," Amazon Web Services, Inc., Believed to be published at least as early as Dec. 7, 2023, Available online at: https://aws.amazon.com/what-is/retrieval-augmented-generation/, 9 pages.

* cited by examiner

RISK-ADJUSTMENT TECHNIQUES FOR GENERATING SOFTWARE CODE DATA

TECHNICAL FIELD

This disclosure relates generally to the field of automated code generation, and more specifically relates to risk-management techniques for automatically generating code.

BACKGROUND

In software development, there is pressure to deliver code at breakneck speed and with few or no quality defects. However, strict mandatory processes, constant identification of security vulnerabilities, evolving best practices, and other factors create a difficult environment for software development. In some cases, a specialist, such as a software developer, is expected to stay updated on all factors that impact software development, including events that can very rapidly change risks associated with software code that is under development. In some cases, the complexity of events and other factors that affect risks for software development can be difficult for a person to comprehend. A person, such as a software developer, who is tasked with writing, testing, deploying, or otherwise developing code might struggle to stay updated on daily or even hourly changes to events that affect risks. In some cases, delayed recognition of risk events, such as by a person who is not aware of recently identified security vulnerabilities or other risks, can result in code errors, software deployed with known security vulnerabilities, inefficient operation of deployed software, or other problematic outcomes during software development.

It is desirable to develop technical tools that can improve code quality, increase delivery speed, and reduce mistakes or oversights that could cause software defects. In some cases, such tools could improve identification of technical risks in code under developments, such as risks related to outdated development environment versions, known issues (e.g., bugs), or other technical aspects that can introduce risk in software development. In addition, such tools could reduce risks related to human error, such as development by a software developer who is not updated on current best practices, known vulnerabilities, or other organizational aspects that can introduce risk in software development.

SUMMARY

According to certain embodiments, a risk-sensitive code generation computing system receives query data that indicates a requested code section or subsection. The risk-sensitive code generation computing system includes a code attribute evaluation module and a code generation module. The code attribute evaluation module determines a set of attributes that indicate characteristics of the query data or the requested code section. Based on the set of attributes, the code attribute evaluation module calculates risk level data that includes a set of risk levels for the requested code section. The code generation module selects, based on the set of risk levels, a set or subset of training resources from multiple code-generation training resources. Based on the selected subset of training resources, the risk-sensitive code generation computing system modifies training of a trained neural network model. The modified trained neural network model is configured to generate data indicating a risk-sensitive code section or subsection that is based on the requested code section. The risk-sensitive code generation computing system receives, from the modified trained neural network model, a risk-sensitive code data object that includes the risk-sensitive code section. The risk-sensitive code generation computing system provides at least a portion of the risk-sensitive code data object to an additional computing system.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

As discussed above, contemporary techniques for software development do not provide techniques to adjust for rapidly changing risks which can affect the technical field of software development. In some cases, contemporary tools for automated code generation can include a large language model (for example, ChatGPT) that can be configured to generate code. However, contemporary code generation models are outdated as soon as they are trained, and are unable to generate code that conforms to current industry practices or known issues (e.g., security vulnerabilities). In some cases, contemporary code generation models may omit updated training materials that address industry practices or known issues. In addition, contemporary code generation models may be trained on unknown training materials, such as training materials that are unverified (e.g., potentially submitted by a malicious party) or irrelevant for a particular software development organization. In some cases, a contemporary code generation model that is trained on unknown training materials can generate insecure code that propagates security vulnerabilities or other known issues, or which may otherwise be inappropriate for the particular software development organization.

Certain embodiments described herein provide techniques to identify risks related to code that is under development, such as risks related to a requested section of code. A risk-sensitive code generation computing system can determine, for a requested section of code, risk level data that describes risks associated with the requested code section. In addition, the risk-sensitive code generation computing system can modify a trained neural network model, such as a trained text generation model, based on training resources that are identified as addressing the risks associated with the requested code section. In some cases, the modified trained neural network model generates risk-sensitive code, data, such as code with characteristics that are adjusted to modify (e.g., reduce) the risk levels based on the identified training resources.

The following examples are provided to introduce certain embodiments of the present disclosure. In the example implementation, a risk-sensitive code generation computing system receives, from a user computing system, query data that describes a requested section of code. A code attribute evaluation module included in the risk-sensitive code generation computing system determines one or more request attributes based on the query data. The determined request attributes describe characteristics of the requested code section, such as a programming language or a website function, or characteristics that are related to the requested code section, such as an assigned development team or an organizational policy for code development. Based on the attributes, the code attribute evaluation module generates risk level data for the requested code section. The risk level data indicates risks that are associated with the requested code section, such as respective risk level values for security vulnerabilities, a level of coding experience for an assigned developer, an industry best practice, or other types of risks that can be associated with code. Based on the request attributes or the risk level data, a code generation module included in the risk-sensitive code generation computing system selects one or more training resources, such as training resources that are related to the risks identified in the risk level data. In addition, a trained neural network model included in the risk-sensitive code generation computing system modifies its training based on the selected training resources, such as training modification via retrieval augmentation generation or another suitable technique to modify neural network training. The modified trained neural network model generates risk-sensitive code data based on a combination of the request attributes, the risk level data, and the modified training (e.g., using the selected training resources). In addition, the code generation module (or another component of the risk-sensitive code generation computing system) generates a risk-sensitive code data object that includes the risk-sensitive code data from the modified trained neural network model. The risk-sensitive code generation computing system provides the risk-sensitive code data object to one or more additional computing systems, such as to the user computing system from which the query data was received.

Certain embodiments described herein provide improved techniques for generating risk-sensitive code data objects. For example, a risk-sensitive code generation computing system as described herein can utilize particular rules to identify risks that are associated with a requested section of code. In addition, the described risk-sensitive code generation computing system can utilize particular rules to select training resources to modify a trained neural network model to generate risk-sensitive code. In some cases, a risk-sensitive code generation computing system as described herein can identify and mitigate (or partially mitigate) risks associated with a particular code request, a particular user, a particular organization, or another particular aspect of the requested code. For example, the described risk-sensitive code generation computing system can select training resources that mitigate one or more of the identified risks, such as by adjusting characteristics of generated code data to reduce one or more risks. In some cases, a risk-sensitive code generation computing system as described herein can improve security for released code or computing systems that utilize the released code, such as by identifying requests for code that are affected by security vulnerabilities and adjusting characteristics of generated code to mitigate the security vulnerabilities. Additionally or alternatively, a risk-sensitive code generation computing system as described herein can improve efficiency for released code or computing systems, such as by identifying training resources that utilize high-efficiency code (e.g., code that efficiently reduces use of processing, memory, network bandwidth, or other computing resources) and adjusting characteristics of generated code to utilize the high-efficiency code. Furthermore, a risk-sensitive code generation computing system as described herein can improve outcomes for a particular software developer, developer team, or other user group by reducing repeated errors, reducing testing time, or otherwise assisting the user group to attain a coding goal.

Figure 1:
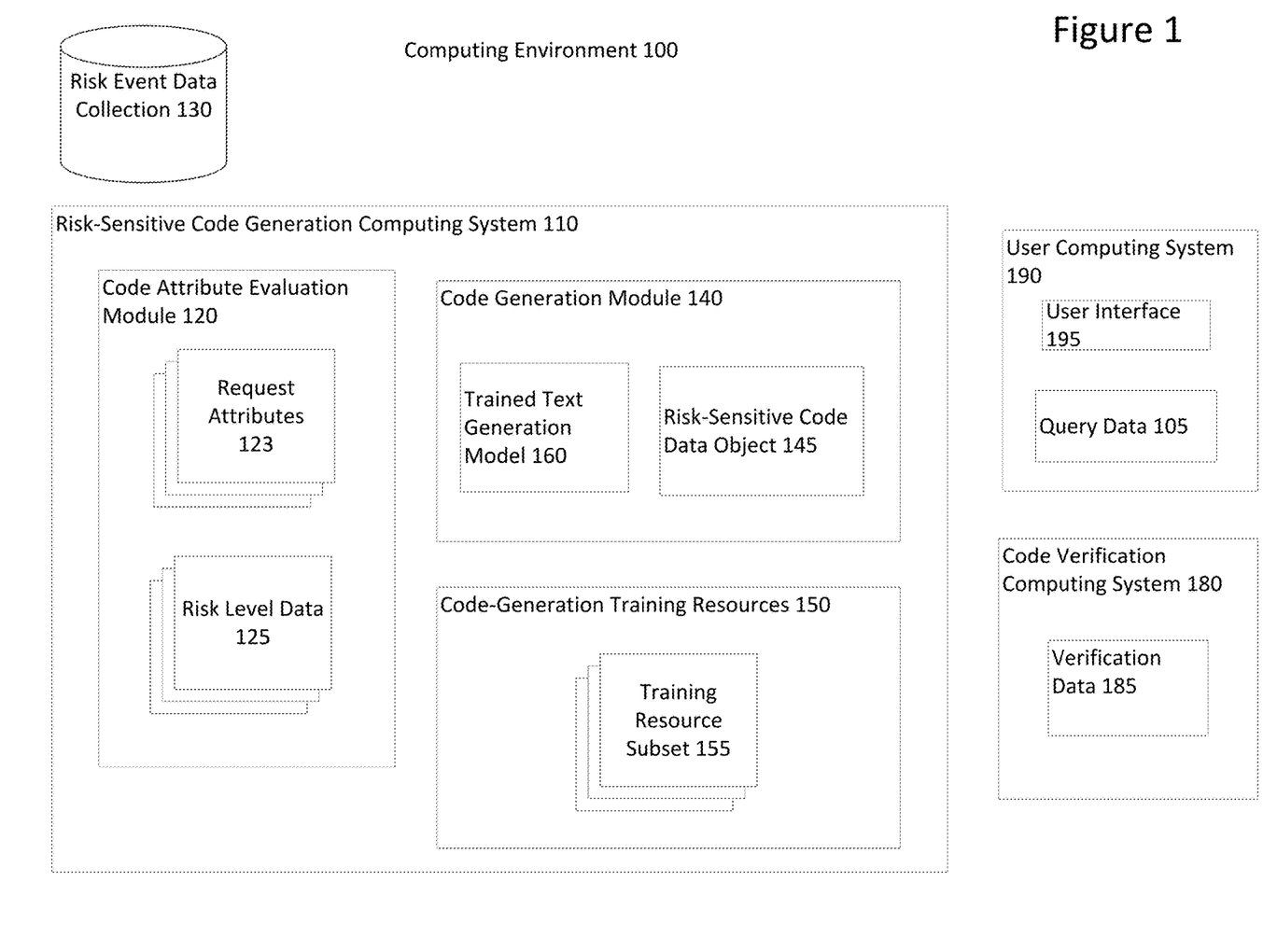
FIG. 1 is a diagram depicting an example of a computing environment in which a risk-sensitive code generation computing system generates one or more risk-sensitive code data objects, according to certain embodiments.

Referring now to the drawings, FIG. 1 is a diagram depicting an example of a computing environment 100, in which a risk-sensitive code generation computing system 110 identifies one or more risk levels associated with a requested section of code. In addition, the risk-sensitive code generation computing system 110 generates, based on the identified risk levels, one or more risk-sensitive code data objects, such as a risk-sensitive code data object 145. The computing environment 100 can include the risk-sensitive code generation computing system 110 and one or more additional computing systems, such as a user computing system 190 or a code verification computing system 180. In some cases, the computing environment 100 includes one or more risk data repositories, such as a risk event data collection 130. In the computing environment 100, the risk-sensitive code generation computing system 110 is configured to communicate with one or more of the computing systems 190 or 180 or the risk event data collection 130 via one or more computing networks, such as a wide-area network or a local-area network. FIG. 1 depicts the risk event data collection 130 as external to the risk-sensitive code generation computing system 110, but other implementations are possible. For example, a risk-sensitive code generation computing system can include one or more risk data repositories, or can utilize a combination of internal risk data repositories and external risk data repositories.

In the computing environment 100, the risk-sensitive code generation computing system 110 receives data that describes a request for a section or subsection of code. For example, the risk-sensitive code generation computing system 110 receives query data 105 from the user computing system 190. The query data 105 describes a requested section of code, such as a code section that is requested by a user of the user computing system 190. For example, the user computing system 190 could generate the query data 105 based on input data received from the user via a user interface 195 of the user computing system 190. In some cases, the query data 105 describes one or more characteristics of the requested code section, such as characteristics describing the code section that is requested, a programming language, a code development environment, a version number, or other characteristics of requested code. As an example, the query data 105 could indicate a code section related to a website login form using the JAVA programming language suitable for the code development environment SE with version 21. Additionally or alternatively, the query data 105 describes one or more non-code characteristics that are associated with the requested code section, such as characteristics describing an organization-level policy, a development guideline, a level of documentation, an interaction with an additional section of code, or other characteristics that are associated with the requested code. As an example, the query data 105 could indicate that the requested code section for a website login form should interact with an additional section of code implementing a retailer website portal and should conform to an organizational policy for low carbon footprint (e.g., efficient implementation).

In FIG. 1, the risk-sensitive code generation computing system 110 includes one or more of a code attribute evaluation module 120 or a code generation module 140. Based on request data such as the query data 105, each of the code attribute evaluation module 120 and the code generation module 140 is configured to generate or otherwise determine data that is related to generation of risk-sensitive code data by the risk-sensitive code generation computing system 110. For example, the code attribute evaluation module 120 identifies one or more attributes of the query data 105, such as request attributes 123. In some cases, the request attributes 123 include attribute data that is selected (or otherwise identified) from the characteristics described by the query data 105, such as selected attribute data describing the example characteristics of a website login form or conformance to an organizational policy for low carbon footprint. Additionally or alternatively, the request attributes 123 include attribute data that is derived by the code attribute evaluation module 120 based on data that is included in or associated with the query data 105. Examples of derived attribute data can include attributes describing characteristics of the user computing system 190 or a user profile implemented on the system 190 (e.g., a software development employee user profile, a software development contractor user profile), characteristics of the user who provided the input data for the query data 105, characteristics of a software environment associated with the requested code (e.g., production environment, non-production environment), or other characteristics that are derived based on additional characteristics included in the query data 105. As an example, based on the example characteristic of a website login form, the code attribute evaluation module 120 could determine a first derived attribute indicating that the requested code section should conform to an organizational policy for high website security (e.g., a website that utilizes the requested website login form). As another example, based on determining that the query data 105 is received from the user computing system 190, the code attribute evaluation module 120 could determine a second derived attribute indicating that the user who requested the code for the website login form has a relatively high level of coding experience.

Based on the request attributes 123 (e.g., selected attribute data, derived attribute data, a combination of selected and derived attribute data), the code attribute evaluation module 120 generates data indicating one or more risks associated with the query data 105, such as risk level data 125. In some cases, the risk level data 125 includes one or more risk level values that indicate respective risks associated with particular attributes (or combinations of attributes) from the request attributes 123. For example, the risk level data 125 can include a first risk level value indicating a software security risk and a second risk level value indicating a developer experience risk. In this example, the code attribute evaluation module 120 calculates the first risk level value based on a first attribute from the request attributes 123, such as attribute data indicating that the requested code section should conform to an organizational policy for high website security. Continuing with this example, the code attribute evaluation module 120 calculates the second risk level value based on a second attribute from the request attributes 123, such as attribute data indicating that the user who requested the code (e.g., via the query data 105) has a relatively high level of coding experience.

In some implementations, the code attribute evaluation module 120 generates the risk level data 125 based on a combination of one or more of the request attributes 123 with additional data, such as additional risk data that is included in the risk event data collection 130. The risk event data collection 130 can include risk data describing characteristics that could modify a risk level of the query data 105, such as modifications to one or more of the risk level values associated with the request attributes 123. Examples of risk data could include risk data describing industry-level risks, such as known security vulnerabilities, deprecated code libraries, industry standards of coding practices, regulatory requirements, or other types of data that affect risks associated with an industry (e.g., a coding industry, an industry that utilizes software development). Additionally or alternatively, examples of risk data could include risk data describing organization-level risks, such as organization policies (e.g., efficient coding, security criteria), code base history, documentation history, organization leadership (e.g., leadership of a developer department), or other types of data that affect risks associated with an organization (e.g., a company, a non-profit organization, a governmental agency). Furthermore, examples of risk data could include risk data describing individual-level risks, such as team changes (e.g., different coworkers), a person's experience level in software development, a person's experience level for a particular category of software development (e.g., a particular language, a particular project type), a code review history for a person (e.g., quality assurance mistakes, improvements made in prior projects), or other types of data that affect risks associated with an individual.

In some cases, the code attribute evaluation module 120 generates or modifies a particular risk level value in the risk level data 125, based on additional risk data included in the risk event data collection 130. For example, the code attribute evaluation module 120 determines that the risk event data collection 130 includes particular risk data describing a recently identified security vulnerability related to website login forms. In addition, the code attribute evaluation module 120 determines a correlation between the particular risk data and one or more attributes from the request attributes 123, e.g., attribute data indicating that the query data 105 describes the requested code section for the example website login form. Responsive to determining a correlation between (or among) the additional risk data in the risk event data collection 130 and one or more attributes from the request attributes 123, the code attribute evaluation module 120 generates or modifies the risk level data 125 based on the correlation. For example, responsive to determining the example correlation between the particular risk data describing the security vulnerability related to website login forms and the attribute data indicating the requested code section for the website login form, the code attribute evaluation module 120 modifies at least one risk level value in the risk level data 125. Using the above examples of the first risk level value indicating a software security risk and the second risk level value indicating a developer experience risk, the code attribute evaluation module 120 could modify one or both of the first risk level value or the second risk level value to indicate an increased risk, e.g., a high likelihood that the security vulnerability could impact the requested code for the example website login form, or a high likelihood that an experienced coder is unaware of the recently identified security vulnerability.

In some implementations, the code attribute evaluation module 120 modifies the risk level data 125 to include causation data, such as causation data that is associated with one or more risk level values in the risk level data 125. For example, the code attribute evaluation module 120 determine a correlation among multiple portions of risk data from the risk event data collection 130. Based on the correlation, the code attribute evaluation module 120 could determine a probability of causation among the multiple risk data portions. As an example, the code attribute evaluation module 120 determines a first portion of risk data describing a revision in a code base for an organization indicated in the query data 105, such as a revision to one or more sections of code related to credit card processing. In this example, the code attribute evaluation module 120 determines a second portion of risk data describing a regulatory change related to credit card processing. Based on the example portions of risk data, the code attribute evaluation module 120 generates causation data indicating a probability that the revision to the sections of code for credit card processing was caused by (or partly caused by) the regulatory change. In this example, the code attribute evaluation module 120 modifies the risk level data 125 to include (or otherwise indicate) the causation data, such as modifying a particular risk level value associated with code sections for credit card processing to include a correlation with the causation data. Examples of causation data could include data indicating probabilities of causation among code revisions, documentation revisions, regulatory updates, organizational policy updates, personnel changes (e.g., new team leadership), or other potential causal relationships among risk data accessed by the code attribute evaluation module 120.

In the risk-sensitive code generation computing system 110, the code attribute evaluation module 120 provides one or more of the request attributes 123 or the risk level data 125 to the code generation module 140. Based on one or more of the request attributes 123 or the risk level data 125, the code generation module 140 modifies a trained text generation model 160 that is included in the code generation module 140. Using the modified trained text generation model 160, the code generation module 140 provides risk-sensitive code, such as the risk-sensitive code data object 145. For example, the code generation module 140 determines, based on the request attributes 123, the requested section of code (e.g., indicated by the query data 105). In addition, the code generation module 140 determines, based on the risk level data 125, one or more risk level values associated with the request attributes 123. Based on the request attributes 123, the risk level data 125, or a combination thereof, the code generation module 140 identifies one or more training resources from a collection of code-generation training resources 150. In some cases, the code-generation training resources 150 are associated with a particular organization, e.g., indicated by the request attributes 123. Examples of training resources included in the code-generation training resources 150 can include historical code (e.g., sections of code from an existing or historical code base), code examples indicating a technique to address a coding issue (e.g., organization-level example code, industry-level example code), coding guidelines (e.g., from a standards organizations), or other types of training resources for software development.

Based on one or more of the request attributes 123 or the risk level data 125, the code generation module 140 selects a training resource subset 155 from the code-generation training resources 150. In addition, the code generation module 140 provides the training resource subset 155 to the trained text generation model 160. In FIG. 1, the trained text generation model 160 is a trained machine-learning model that includes a large language model (e.g., "LLM"), but other types of machine-learning models configured to generate text data could be used. In some cases, the trained text generation model 160 is configured to modify its training based on received training resources, such as one or more resources from the training resource subset 155. For example, the trained text generation model 160 can modify its training via one or more techniques, such as retrieval augmentation generation (e.g., "RAG") or other techniques to modify training. In some cases, the trained text generation model 160 modifies its training in real-time (e.g., within a period of time unnoticeable by humans) using a suitable real-time training modification technique. Based on the modified training, the trained text generation model 160 generates data, such as text data, describing one or more risk-sensitive code sections. For example, the trained text generation model 160 identifies, via at least one attribute of the request attributes 123, the requested code section. In addition, the trained text generation model 160 generates the requested code section with one or more characteristics that are modified, e.g., based on the modified training, to reduce (or otherwise adjust) one or more risks associated with the requested code section. In addition, the code generation module 140 generates one or more data objects, such as the risk-sensitive code data object 145, based on output data from the trained text generation model 160 that describes the requested code section having the risk-adjusted characteristics.

Using the above example of particular risk data describing a recently identified security vulnerability related to website login forms, the trained text generation model 160 generates a section of code that can implement a website login form that includes the characteristics described by the request attributes 123, such as using the JAVA programming language and having a level of coding detail suitable for a coder with a relatively high level of experience. In addition, the trained text generation model 160 generates the section of code having additional characteristics that adjust one or more risks described by the risk level data 125, such as a particular implementation of the generated code section that addresses the example security vulnerability related to website login forms. Continuing with this example, the code generation module 140 generates or modifies the risk-sensitive code data object 145 to include the generated risk-sensitive code section, e.g., having the risk-adjusted characteristics.

In some cases, the trained text generation model 160 generates text data (or other types of data) that describe documentation for the generated code section, such as commenting that can be included in the code section. Additionally or alternatively, the trained text generation model 160 generates a particular portion of documentation data that is correlated with one or more risk-adjusted characteristics of the generated code section. In some cases, the code generation module 140 determines, based on the request attributes 123, a comment detail level associated with the requested code section. Responsive to receiving the comment detail level from the code generation module 140, the trained text generation model 160 generates documentation data having a particular level of detail indicated by the comment detail level. For the example generated code section, the trained text generation model 160 generates documentation data that is correlated with the particular implementation addressing the example security vulnerability. As an example of documentation data, the trained text generation model 160 generates text data that indicates comments for one or more lines of code that are modified to address the example security vulnerability (e.g., risk-adjusted characteristics of the generated code section). In addition, the example comments describe, at a relatively high level of detail, the modifications made by the trained text generation model 160 to the generated code section. In some cases, the example documentation data describes one or more risk levels associated with the modification, e.g., comments that describe the example security vulnerability and an associated risk level. Additionally or alternatively, the example documentation data describes one or more resources, such as from the training resource subset 155, utilized by the trained text generation model 160 determine the modifications or other risk-adjusted characteristics of the generated code section. Continuing with this example, the code generation module 140 generates or modifies the risk-sensitive code data object 145 to include the documentation data for the generated risk-sensitive code section.

In FIG. 1, the risk-sensitive code generation computing system 110 provides the risk-sensitive code data object 145 (or a portion thereof) to one or more additional computing systems, such as the user computing system 190 or the code verification computing system 180. For example, the user computing system 190 is configured to present the risk-sensitive code data object 145, such as via the user interface 195, to a user who is associated with the query data 105. In some cases, the user computing system 190 is configured to implement one or more sections of the risk-sensitive code included in the risk-sensitive code data object 145, such as by including the risk-sensitive code sections in code under development, e.g., in a coding environment provided via the user computing system 190. In some cases, the risk-sensitive code generation computing system 110 provides the risk-sensitive code data object 145 to the code verification computing system 180. Based on the risk-sensitive code data object 145, the code verification computing system 180 generates verification data 185. In some cases, the verification data 185 indicates one or more verification techniques applied to one or more sections of code that include the risk-sensitive code sections from the risk-sensitive code data object 145. For example, the code verification computing system 180 could determine a quality assurance testing sequence for the code under development (e.g., from the user computing system 190) that includes the risk-sensitive code sections, and generate or modify the verification data 185 to indicate the quality assurance testing sequence. Additionally or alternatively, the code verification computing system 180 could determine one or more additional computing systems, such as a user device associated with a team leader for the user of the user computing system 190. For example, one or more of the risk-sensitive code generation computing system 110 or the code verification computing system 180 could calculate a recommended review value, based on one or more risk level values from the risk level data 125. Based on a comparison of the recommended review value with a testing threshold level, the code verification computing system 180 generates or modifies the verification data 185 to include a testing data object, such as a testing data object that describes a testing process for the risk-sensitive code in the risk-sensitive code data object 145. Additionally or alternatively, based on a comparison of the recommended review value with a review threshold, the risk-sensitive code generation computing system 110 or the code verification computing system 180 provides the risk-sensitive code data object 145 to an additional user computing system, such as the user device associated with the team leader. In some cases, the code verification computing system 180 generates or modifies the verification data 185 to indicate the quality assurance testing sequence, the one or more additional computing systems, or other types of verification data.

In some cases, a risk-sensitive code generation computing system can identify one or more risks associated with a particular requested code section. For example, the risk-sensitive code generation computing system could identify risks related to security, efficiency, interoperability (e.g., with an additional section of code), or other types of risks related to development of software code. In addition, the risk-sensitive code generation computing system can improve implementation of the particular requested code section, such as by adjusting characteristics of the requested code section to reduce (or otherwise modify) one or more of the identified risks. In some cases, a risk-sensitive code generation computing system that uses one or more techniques described herein can generate data that indicates a correlation or a causation (or both) among code sections or risk data. Based on the data indicating the correlation or causation, the risk-sensitive code generation computing system can identify a characteristic of the requested code section that has a relationship with a particular portion of the risk data, such as a particular code modification that is correlated with an event (e.g., a discovered security vulnerability). In some cases, correlation data or causation data generated by a risk-sensitive code generation computing system can improve outcomes related to identified risks for a risk-sensitive code section, such as an improved outcome for security, efficiency, interoperability, or other types of risks identified as being related to the particular code modification. Additionally or alternatively, correlation data or causation data generated by a risk-sensitive code generation computing system can improve outcomes for an individual who is tasked with implementing the particular requested code section, such as a software developer. Examples of improved outcomes for a software developer or other individual can include reduced time for development, reduced errors in the implemented code, recognition of increased testing for the particular code modification (or other sections of the implemented code section), improved interoperability among multiple code sections that have a correlation with an identified risk, or other types of improvements for the individual who receives the correlation data or causation data generated by the risk-sensitive code generation computing system.

Figure 2:
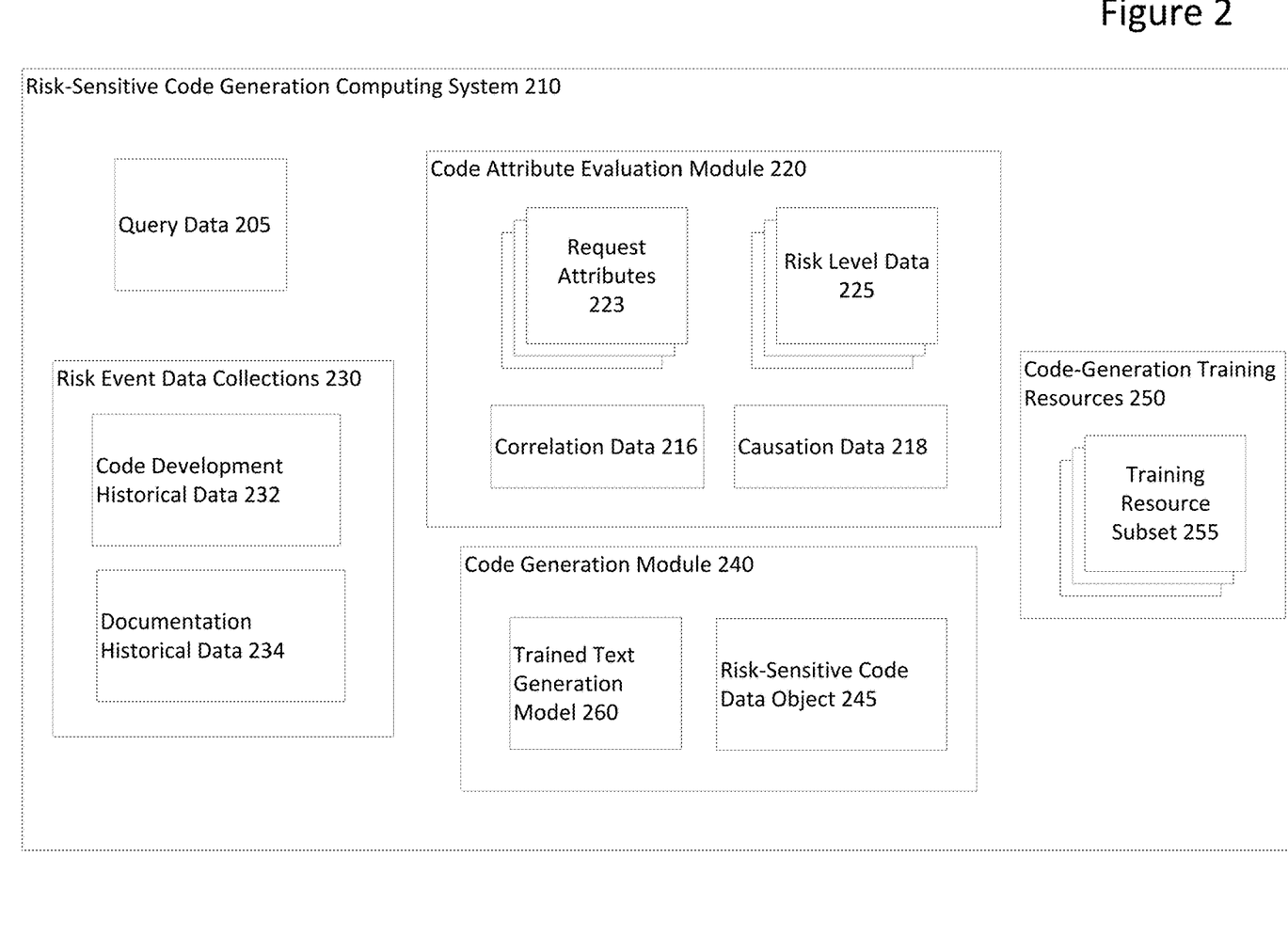
FIG. 2 is a diagram depicting an example of a risk-sensitive code generation computing system configured to generate one or more of correlation data or causation data that are associated with risk data, according to certain embodiments.

FIG. 2 is a diagram depicting an example of a risk-sensitive code generation computing system 210 that can generate data indicating one or more of correlation or causation that is associated with risk data. The risk-sensitive code generation computing system 210 includes one or more of a code attribute evaluation module 220 or a code generation module 240. In FIG. 2, the risk-sensitive code generation computing system 210 includes (or is otherwise configured to communicate with) one or more risk data repositories, such as a risk event data collection 230. In some cases, the risk-sensitive code generation computing system 210 is configured to communicate with one or more additional computing systems, such as a user computing system or a code verification computing system (e.g., as described in regard to FIG. 1).

In FIG. 2, the risk-sensitive code generation computing system 210 receives data, such as query data 205, that describes a request for a section or subsection of code. For example, the risk-sensitive code generation computing system 210 receives the query data 205 from a user computing system, e.g., a user computing system that is associated with a software developer or another individual who desires the requested section or subsection of code. In some cases, the query data 205 describes one or more characteristics of the requested code section, such as code characteristics (e.g., programming languages, development environment), non-code characteristics (e.g., an organization-level policy, an assigned development team), or other types of characteristics associated with the requested code section.

Based on the query data 205, the code attribute evaluation module 220 identifies a group of request attributes 223, including one or more of attributes of the query data 205. The request attributes 223 can include selected attribute data that is described by the query data 205, derived attribute data that is determined (e.g., by the code attribute evaluation module 220) based on the query data 205, or other types of attribute data. In addition, based on the request attributes 223, the code attribute evaluation module 220 generates risk level data 225 that includes one or more risk level values indicating respective risks associated with particular attributes (or combinations of attributes) from the request attributes 223. In some implementations, the code attribute evaluation module 220 generates the risk level data 225 based on a combination of one or more of the request attributes 223 with additional data, such as risk data that is included in the risk event data collection 230. The risk event data collection 230 includes risk data describing characteristics that could modify a risk level of the query data 205, such as modifications to one or more of the risk level values associated with the request attributes 223.

In FIG. 2, the risk event data collection 230 includes a first portion of data that describes historical code data, such as code development historical data 232. In some cases, at least a portion of the code development historical data 232 is risk data describing one or more risks (e.g., testing failures, change requests related to a security vulnerability) that correspond to a requested code section, such as the requested code section indicated by the query data 205. Examples of data included in the code development historical data 232 can include a code repository (e.g., code that is used by an organization), historical code versions, change requests (e.g., historical requests to modify a section of code), testing data (e.g., describing a success or failure of a particular historical code section), or other types of data describing historical activities related to one or more code repositories.

Additionally or alternatively, the risk event data collection 230 includes a second portion of data that describes historical documentation data, such as documentation historical data 234. In some cases, at least a portion of the documentation historical data 234 is risk data describing one or more risks indicated by documentation (e.g., documentation describing reasons for code modifications, documentation describing a code version history) corresponding to a requested code section, such as the requested code section indicated by the query data 205. Examples of data included in the documentation historical data 234 can include comments (e.g., in historical code sections), data generated by issue-tracking software (e.g., data describing software bugs or other known issues), schedule data (e.g., data describing development release schedules), or other types of data describing historical documentation related to one or more code sections. In some cases, the documentation historical data 234 indicates an omission of documentation that corresponds to the requested code section described by the query data 205. In this example, the code attribute evaluation module 220 can identify risk data based on the omission of documentation data, e.g., a historical code modification occurred quickly without allocating time to include documentation data describing the modification.

In the risk-sensitive code generation computing system 210, the code attribute evaluation module 220 generates correlation data 216. In addition, the correlation data 216 describes one or more correlations between or among the request attributes 223 or the risk data indicted by the risk event data collection 230. In some cases, the correlation data 216 describes a correlation among multiple attributes from the request attributes 223, a correlation among multiple risk data portions from the risk event data collection 230, a correlation among a combination of at least one request attribute and at least one risk data portion, or a combination of correlation types. In the risk-sensitive code generation computing system 210, the code attribute evaluation module 220 generates or modifies the risk level data 225 based on the correlation data 216. For example, the code attribute evaluation module 220 determines a first correlation between a request attribute indicating the requested code section and a portion of historical code data indicating a high error rate (e.g., testing failure data) for historical versions of code associated with the requested code section. In addition, the code attribute evaluation module 220 generates, in the correlation data 216, a first portion of correlation data that describes the first determined correlation. Based on the first portion of correlation data, the code attribute evaluation module 220 modifies the risk level data 225, such as modifying a first risk level value to indicate an increased risk (e.g., a risk of failed testing) that is associated with the requested code section.

Additionally or alternatively, the code attribute evaluation module 220 generates causation data 218. In addition, the causation data 218 describes one or more probabilities of causal relationships between or among multiple risk data portions included in the risk event data collection 230. For example, the causation data 218 describes at least one probability that an event (or other activity) described by a portion of risk data caused or partially caused an additional event (or other activity) described by an additional portion of risk data from the risk event data collection 230. In the risk-sensitive code generation computing system 210, the code attribute evaluation module 220 generates or modifies the risk level data 225 based on the causation data 218. For example, the code attribute evaluation module 220 identifies, in the risk event data collection 230, a first portion of risk data indicating a regulatory event, e.g., first risk data describing a change in governmental regulations related to security in consumer-facing websites. In addition, the code attribute evaluation module 220 identifies, in the risk event data collection 230, a second portion of risk data indicating a historical code modification, e.g., historical code data describing a group of multiple code modifications associated with website security. In some cases, the code attribute evaluation module 220 determines that at least one of the first or second portions of risk data is associated with the requested code section, e.g., an attribute of the request attributes 223 indicates that the requested code section is associated with website security in a consumer-facing website. In this example, the code attribute evaluation module 220 determines a first causation probability between the first and second portions of risk data, e.g., a probability that the group of multiple code modifications were caused (or partially caused) by the change in governmental regulations. In addition, the code attribute evaluation module 220 generates, in the causation data 218, a first portion of causation data that describes the first determined causation probability. Based on the first portion of causation data, the code attribute evaluation module 220 modifies the risk level data 225, such as modifying a second risk level value to indicate an association of the first causation probability with the requested code section. In FIG. 2, the code attribute evaluation module 220 is described as generating the correlation data 216 and the causation data 218, but other implementations are possible, such as correlation data or causation data generated by one or more additional components of a risk-sensitive code generation computing system.

In the risk-sensitive code generation computing system 210, the code generation module 240 receives (or otherwise accesses) one or more of the request attributes 223 or the risk level data 225. In addition, the code generation module 240 receives (or otherwise accesses) one or more of the correlation data 216 or the causation data 218. In FIG. 2, the code generation module 240 modifies a trained text generation model 260 based on a combination of some or all of the request attributes 223, the risk level data 225, the correlation data 216, or the causation data 218. In some cases, the code generation module 240 modifies a training of the trained text generation model 260 based on one or more training resources, such as a subset of training resources 255, that are selected from a collection of code-generation training resources 250. For example, the code generation module 240 identifies, in the correlation data 216, the example first portion of correlation data describing the first correlation between the request attribute for the requested code section and the portion of historical code data indicating a high error rate for historical versions of code. Additionally or alternatively, the code generation module 240 identifies, in the risk level data 225, the example first risk level value indicating an increased risk (e.g., a risk of failed testing) associated with the requested code section. Based on the correlation data 216 or the risk level data 225 (or a combination thereof), the code generation module 240 selects, from the code-generation training resources 250, a particular training resource describing errors or testing techniques associated with the requested code section. In addition, the code generation module 240 modifies the training resources subset 255 to include the particular training resource. Additionally or alternatively, the code generation module 240 identifies, in the causation data 218, the example first portion of causation data describing the first causation probability that the group of multiple code modifications were caused by the change in governmental regulations. Additionally or alternatively, the code generation module 240 identifies, in the risk level data 225, the example second risk level value indicating an association of the first causation probability with the requested code section. Based on the causation data 218 or the risk level data 225 (or a combination thereof), the code generation module 240 selects, from the code-generation training resources 250, an additional training resource describing potential code modifications related to the change in governmental regulations. In addition, the code generation module 240 modifies the training resources subset 255 to include the additional training resource.

In FIG. 2, the trained text generation model 260 modifies its training based on the training resources subset 255 that is selected by the code generation module 240. In addition, based on the modified training, the trained text generation model 260 generates data describing one or more risk-sensitive code sections. For example, the trained text generation model 260 identifies, via at least one attribute of the request attributes 223, the requested code section. In addition, the trained text generation model 260 generates, e.g., based on the modified training, the requested code section with one or more characteristics that are modified to adjust one or more risks associated with the requested code section. In FIG. 2, the risk-adjusted characteristics are modified based on one or more of the correlation data 216 or the causation data 218, such as modifications determined by the trained text generation model 260 to adjust code characteristics associated with the example first and second risk level values described above. In addition, one or more of the code generation module 240 or the trained text generation model 260 generates or modifies the risk-sensitive code data object 245 to include the one or more risk-sensitive code sections generated by the trained text generation model 260. For example, the code generation module 240 modifies the risk-sensitive code data object 245 to include the requested code section with the risk-adjusted characteristics.

In FIG. 2, the risk-sensitive code generation computing system 210 provides the risk-sensitive code data object 245 (or a portion thereof) to one or more additional computing systems. For example, the risk-sensitive code generation computing system 210 could provide the risk-sensitive code data object 245 to a user computing system that is configured to present at least a portion of the risk-sensitive code data object 245 via a user interface, such as the user computing system 190 described in regard to FIG. 1. Additionally or alternatively, the risk-sensitive code generation computing system 210 could provide the risk-sensitive code data object 245 to an additional computing system that is configured to generate verification data based on the risk-sensitive code data object 245, such as the code verification computing system 180 described in regard to FIG. 1.

In some implementations, the risk-sensitive code generation computing system 210 modifies one or more portions of the risk event data collection 230 based on the risk-sensitive code data object 245. For example, based on risk-sensitive code that is included in (or indicated by) the risk-sensitive code data object 245, the risk-sensitive code generation computing system 210 can modify one or more of the code development historical data 232 or the documentation historical data 234 to include the risk-sensitive code or data associated with the risk-sensitive code. In some cases, the risk-sensitive code generation computing system 210 modifies one or more of the code development historical data 232 or the documentation historical data 234 based on one or more of the request attributes 223, the risk level data 225, the correlation data 216, or the causation data 218. As an example, the risk-sensitive code generation computing system 210 could modify one or more of the historical data 232 or 234 to include data indicating one or more attributes or risk level values of the requested code section for which the risk-sensitive code was generated. Additionally or alternatively, the risk-sensitive code generation computing system 210 could modify one or more of the historical data 232 or 234 to include data indicating one or more portions of correlation data or causation data indicating relationships among risk data, attributes, or characteristics of the risk-sensitive code (e.g., risk-adjusted characteristics). In some cases, the risk-sensitive code generation computing system 210 modifies the code-generation training resources 250 based on the risk-sensitive code data object 245, such as by including an additional training resource indicating the risk-sensitive code.

Figure 3:
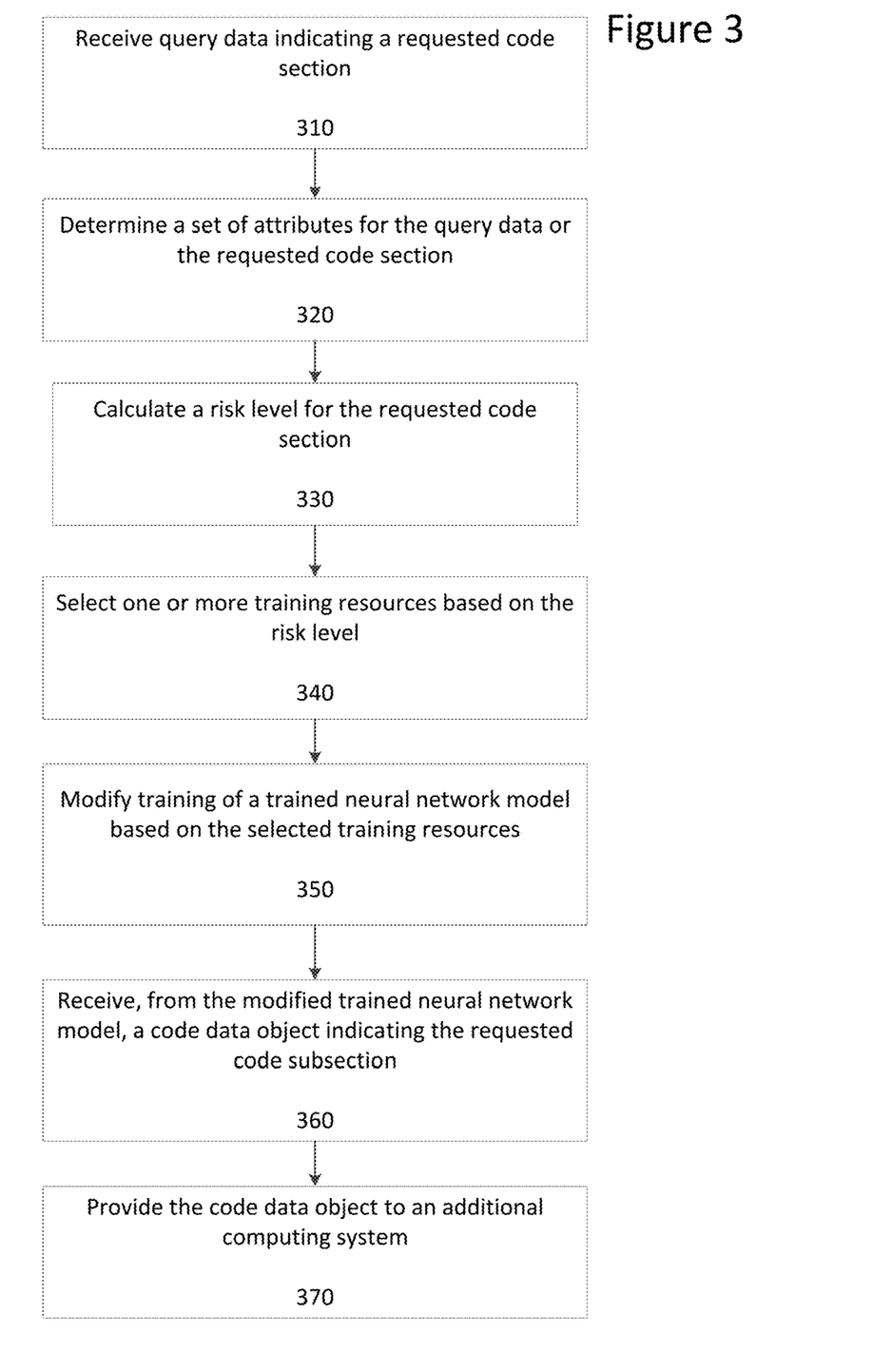
FIG. 3 is a flow chart depicting an example of a process for generating a risk-sensitive code section, according to certain embodiments.

FIG. 3 is a flow chart depicting an example of a process 300 for generating a risk-sensitive code section or subsection. In some embodiments, such as described in regards to FIGS. 1-2, a computing device executing a risk-sensitive code generation computing system implements operations described in FIG. 3, by executing suitable program code. For illustrative purposes, the process 300 is described with reference to the examples depicted in FIGS. 1-2. Other implementations, however, are possible.

At block 310, the process 300 involves receiving query data indicating a requested section (or subsection) of code. For example, a risk-sensitive code generation computing system receives query data from an additional computing system, such as a user computing system. In some cases, the query data describes one or more characteristics of the requested code section, such as code characteristics, non-code characteristics, or other types of characteristics associated with the requested code section. For example the risk-sensitive code generation computing system 110 receives the query data 105 from the user computing system 190. In addition, the query data 105 describes characteristics of a particular section of code that is requested by a user of the user computing system 190.

At block 320, the process 300 involves determining a set of one or more attributes, such as attributes of the query data or the requested code section. In some cases, a code attribute evaluation module included in the risk-sensitive code generation computing system determines the set of attributes. For example, the code attribute evaluation module generates one or more attributes in the set of attributes based on selected attribute data, such as attribute data selected from the characteristics described by the query data. Additionally or alternatively, the code attribute evaluation module generates one or more attributes in the set of attributes based on derived attribute data, such as attribute data that is derived by the code attribute evaluation module based on characteristics that are included in or associated with the query data. For example, the code attribute evaluation module 120 generates the request attributes 123 based on the query data 105. In addition, the request attributes 123 include a combination of selected attribute data and derived attribute data.

At block 330, the process 300 involves calculating one or more risk levels for the requested code section. In addition, the one or more risk levels indicate respective risks for the requested code section, such as risks associated with one or more attributes from the set of attributes. In some cases, the code attribute evaluation module calculates the risk levels. Additionally or alternatively, the risk levels are calculated based on the set of attributes. For example, based on the request attributes 123, the code attribute evaluation module 120 generates the risk level data 125 that includes one or more risk level values. In some cases, the one or more risk levels are calculated based on additional data generated by the risk-sensitive code generation computing system, such as correlation data or causation data. For example, the code attribute evaluation module 220 generates one or more of the correlation data 216 or the causation data 218. In addition, the code attribute evaluation module 220 generates or modifies the risk level data 225 based on one or more of the correlation data 216 or the causation data 218.

At block 340, the process 300 involves selecting one or more training resources from a group of code-generation training resources, such as a selected set or subset of training resources. In some cases, a code generation module included in the risk-sensitive code generation computing system determines the subset of training resources. Additionally or alternatively, the subset of training resources are selected based on the set of attributes. For example, based on one or more of the request attributes 123 or the risk level data 125, the code generation module 140 selects the training resource subset 155 from the code-generation training resources 150. In some cases, the subset of training resources are selected based on one or more of correlation data or causation data. For example, the code generation module 240 selects one or more resources in the training resource subset 255 based on a combination of some or all of the request attributes 223, the risk level data 225, the correlation data 216, or the causation data 218.

At block 350, the process 300 involves modifying training of a trained neural network model, such as a trained text generation model that is included in the risk-sensitive code generation computing system. In addition, the training of the trained text generation model is modified based on the selected subset of training resources, such as modifications that utilize the raining resources selected based on the risk level data 125 or the request attributes 123. For example, the trained text generation model 160 modifies its training based on the training resource subset 155 selected by the code generation module 140. In some cases, the training of the trained text generation model is modified based on one or more of correlation data or causation data. For example, the code generation module 240 modifies training of the trained text generation model 260 (e.g., by selecting a resource for the training resource subset 255) based on a combination of some or all of the request attributes 223, the risk level data 225, the correlation data 216, or the causation data 218.

At block 360, the process 300 involves receiving one or more risk-sensitive code data objects from the modified trained neural network model. For example, the modified trained text generation model generates risk-sensitive data, such as text data, that indicates one or more sections of risk-sensitive code. The generated risk-sensitive code sections have one or more risk-adjusted characteristics, such as characteristics that are modified (e.g., based on the modified training) to adjust one or more risks associated with the requested code section. In some cases, the code generation module (or another component of the risk-sensitive code generation computing system) generates a risk-sensitive code data object based on the risk-sensitive code sections generated by the modified trained text generation model. For example, the modified trained text generation model 160 generates one or more risk-sensitive code sections. In addition, the code generation module 140 generates the risk-sensitive code data object 145 based on the risk-sensitive code sections generated by the modified trained text generation model 160.

At block 370, the process 300 involves providing the one or more risk-sensitive code data objects to at least one additional computing system. In some cases, the risk-sensitive code generation computing system provides the risk-sensitive code data object to one or more of a user computing system, a code verification computing system, or another type of additional computing system. For example, the risk-sensitive code generation computing system 110 provides the risk-sensitive code data object 145 to one or more of the user computing system 190 or the code verification computing system 180.

Figure 4:
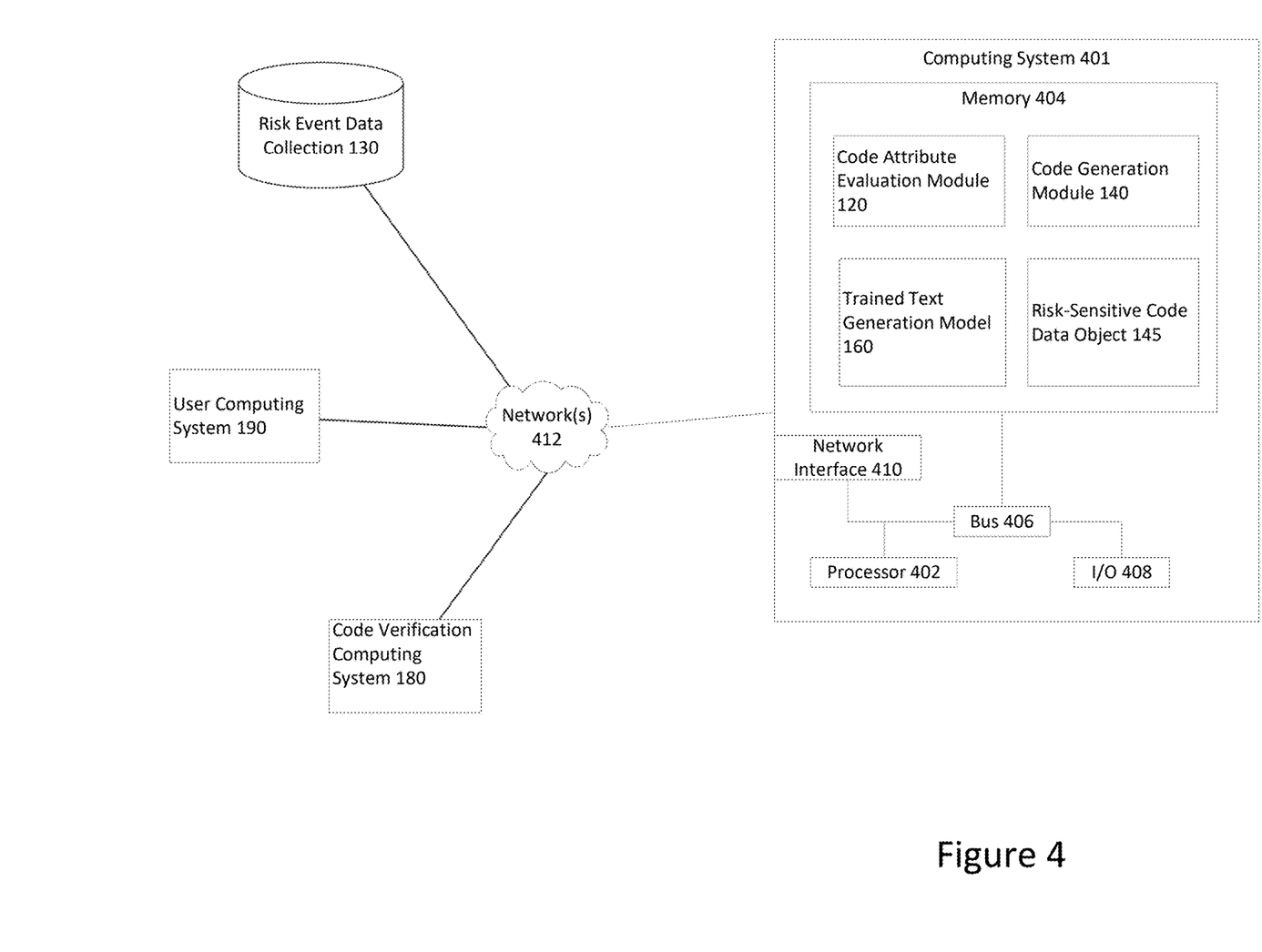
FIG. 4 is a diagram depicting an example of a computing system for implementing a risk-sensitive code generation computing system, according to certain embodiments.

Any suitable computing system or group of computing systems can be used for performing the operations described herein. For example, FIG. 4 is a block diagram depicting a computing system configured to implement a risk-sensitive code generation computing system, according to certain embodiments.

The depicted example of a computing system 401 includes one or more processors 402 communicatively coupled to one or more memory devices 404. The processor 402 executes computer-executable program code or accesses information stored in the memory device 404. Examples of processor 402 include a microprocessor, an application-specific integrated circuit ("ASIC"), a field-programmable gate array ("FPGA"), or other suitable processing device. The processor 402 can include any number of processing devices, including one.

The memory device 404 includes any suitable non-transitory computer-readable medium for storing the code attribute evaluation module 120, the code generation module 140, the trained text generation model 160, the risk-sensitive code data object 145, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 401 may also include a number of external or internal devices such as input or output devices. For example, the computing system 401 is shown with an input/output ("I/O") interface 408 that can receive input from input devices or provide output to output devices. A bus 406 can also be included in the computing system 401. The bus 406 can communicatively couple one or more components of the computing system 401.

The computing system 401 executes program code that configures the processor 402 to perform one or more of the operations described above with respect to FIGS. 1-3. The program code includes operations related to, for example, one or more of the code attribute evaluation module 120, the code generation module 140, the trained text generation model 160, the risk-sensitive code data object 145, or other suitable applications or memory structures that perform one or more operations described herein. The program code may be resident in the memory device 404 or any suitable computer-readable medium and may be executed by the processor 402 or any other suitable processor. In some embodiments, the program code described above, the code attribute evaluation module 120, the code generation module 140, the trained text generation model 160, and the risk-sensitive code data object 145 are stored in the memory device 404, as depicted in FIG. 4. In additional or alternative embodiments, one or more of the code attribute evaluation module 120, the code generation module 140, the trained text generation model 160, the risk-sensitive code data object 145, and the program code described above are stored in one or more memory devices accessible via a data network, such as a memory device accessible via a cloud service.

The computing system 401 depicted in FIG. 4 also includes at least one network interface 410. The network interface 410 includes any device or group of devices suitable for establishing a wired or wireless data connection to one or more data networks 412. Non-limiting examples of the network interface 410 include an Ethernet network adapter, a modem, and/or the like. The computing system 401 is able to communicate with one or more of the risk event data collection 130, the user computing system 190, or the code verification computing system 180 using the network interface 410. Although FIG. 4 depicts the risk event data collection 130 as connected to the computing system 401 via the data networks 412, other embodiments are possible, including one or more collections of risk event data organized in the memory device 404 of the computing system 401.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:
1. A system comprising:
   a processor, and a non-transitory computer-readable storage device storing instructions that are executable by the processor to:
receive, from a user computing system, query data indicating a requested code subsection;
determine, via a code attribute evaluation module, a set of attributes indicating one or more characteristics of the query data or the requested code subsection;
calculate, based on the set of attributes and via the code attribute evaluation module, a set of risk levels for the requested code subsection;
select, based on the set of risk levels and via a code generation module, a subset of training resources from a group of multiple code-generation training resources;
based on the selected subset of training resources, modify training of a trained text generation model that is configured to generate text data indicating a risk-sensitive code subsection based on the requested code subsection;
receive, from the modified trained text generation model, a risk-sensitive code data object that includes the text data indicating the risk-sensitive code subsection; and
provide the risk-sensitive code data object to the user computing system.

2. The system of claim 1, wherein calculating the set of risk levels further comprises:
accessing one or more risk event data collections;
determining a correlation between a particular attribute from the set of attributes and particular risk data included in the risk event data collections; and
determining, based on the correlation, at least one risk level value indicating a relative risk associated with the particular attribute.

3. The system of claim 1, the instructions further executable to:
access historical data associated with a previous code version associated with the requested code subsection;
identify risk event data correlated with the previous code version;
calculate a causation probability indicating a likelihood that the previous code version was modified in response to an event described by the risk event data; and
modify the set of risk levels based on the causation probability.

4. The system of claim 3, wherein the historical data includes one or more of: the previous code version, change request data associated with the previous code version, or documentation data associated with the previous code version.

5. The system of claim 1, the instructions further executable to:
determine, based on the set of risk levels, a recommended review value associated with the risk-sensitive code data object; and
responsive to determining that the recommended review value exceeds a review threshold value, provide the risk-sensitive code data object to an additional user computing system.

6. The system of claim 5, the instructions further executable to, responsive to determining that the recommended review value exceeds a testing threshold level, generate one or more testing data objects associated with the risk-sensitive code data object.

7. The system of claim 1, wherein the risk-sensitive code data object includes additional text data indicating comments, wherein determining the comments comprises:
determining, based on the set of attributes and by the code generation module, a comment detail level associated with one or more code segments included in the requested code subsection; and
generating, based on the comment detail level and by the code generation module, the additional text data indicating comments.

8. The system of claim 1, wherein the set of attributes includes at least one attribute associated with one or more of:
a security vulnerability associated with the requested code subsection;
an additional code subsection with which the requested code subsection is configured to interoperate;
an organization policy associated with the requested code subsection; or
an experience level of a user associated with the user computing system.

9. A method including operations executed by a processor, the operations comprising:
receiving, from an additional computing system, query data indicating a requested code section;
determining a set of attributes indicating one or more characteristics of the query data or the requested code section;
calculating, based on the set of attributes, a set of risk levels for the requested code section;
selecting, based on the set of risk levels, a subset of training resources from multiple code-generation training resources;
based on the selected subset of training resources, modifying training of a trained neural network model that is configured to generate data indicating a risk-sensitive code section that is based on the requested code section;
receiving, from the modified trained neural network model, a risk-sensitive code data object that includes the data indicating the risk-sensitive code section; and
providing the risk-sensitive code data object to the additional computing system.

10. The method of claim 9, wherein calculating the set of risk levels further comprises:
accessing one or more risk event data collections;
determining a correlation between a particular attribute from the set of attributes and particular risk data included in the risk event data collections; and
determining, based on the correlation, at least one risk level value indicating a relative risk associated with the particular attribute.

11. The method of claim 9, the operations further comprising:
accessing historical data associated with a previous code version associated with the requested code section;
identifying risk event data correlated with the previous code version;
calculating a causation probability indicating a likelihood that the previous code version was modified in response to an event described by the risk event data; and
modifying the set of risk levels based on the causation probability.

12. The method of claim 9, the operations further comprising:
determining, based on the set of risk levels, a recommended review value associated with the risk-sensitive code data object; and
responsive to determining that the recommended review value exceeds a review threshold value, providing the risk-sensitive code data object to an additional user computing system.

13. The method of claim 12, the operations further comprising, responsive to determining that the recommended review value exceeds a testing threshold level, generate one or more testing data objects associated with the risk-sensitive code data object.

14. The method of claim 9, wherein the risk-sensitive code data object includes text data indicating comments, wherein determining the comments comprises:
   determining, based on the set of attributes, a comment detail level associated with one or more code segments included in the requested code section; and
   generating, based on the comment detail level, the text data indicating the comments.

15. The method of claim 9, wherein the set of attributes includes at least one attribute associated with one or more of:
   a security vulnerability associated with the requested code section;
   an additional code section with which the requested code section is configured to interoperate;
   an organization policy associated with the requested code section; or
   an experience level of a user associated with the additional computing system.

16. A non-transitory computer-readable medium embodying program code, wherein, when executed by a processor, the program code causes the processor to perform operations comprising:
   receiving, from an additional computing system, query data indicating a requested code section;
   determining a set of attributes indicating one or more characteristics of the query data or the requested code section;
   calculating, based on the set of attributes, a set of risk levels for the requested code section;
   selecting, based on the set of risk levels, a subset of training resources from multiple code-generation training resources;
   based on the selected subset of training resources, modifying training of a trained neural network model that is configured to generate data indicating a risk-sensitive code section that is based on the requested code section;
   receiving, from the modified trained neural network model, a risk-sensitive code data object that includes the data indicating the risk-sensitive code section; and
   providing the risk-sensitive code data object to the additional computing system.

17. The non-transitory computer-readable medium of claim 16, wherein calculating the set of risk levels further comprises:
   accessing one or more risk event data collections;
   determining a correlation between a particular attribute from the set of attributes and particular risk data included in the risk event data collections; and
   determining, based on the correlation, at least one risk level value indicating a relative risk associated with the particular attribute.

18. The non-transitory computer-readable medium of claim 16, the operations further comprising:
   accessing historical data associated with a previous code version associated with the requested code section;
   identifying risk event data correlated with the previous code version;
   calculating a causation probability indicating a likelihood that the previous code version was modified in response to an event described by the risk event data; and
   modifying the set of risk levels based on the causation probability.

19. The non-transitory computer-readable medium of claim 16, the operations further comprising:
   determining, based on the set of risk levels, a recommended review value associated with the risk-sensitive code data object; and
   responsive to determining that the recommended review value exceeds a review threshold value, providing the risk-sensitive code data object to an additional user computing system.

20. The non-transitory computer-readable medium of claim 16, wherein the set of attributes includes at least one attribute associated with one or more of:
   a security vulnerability associated with the requested code section;
   an additional code section with which the requested code section is configured to interoperate;
   an organization policy associated with the requested code section; or
   an experience level of a user associated with the additional computing system.

* * * * *